(12) United States Patent
Jiang et al.

(10) Patent No.: US 8,378,259 B2
(45) Date of Patent: Feb. 19, 2013

(54) ELIMINATING HEAD-TO-HEAD OFFSETS ALONG COMMON CHUCK TRAVEL DIRECTION IN MULTI-HEAD LASER MACHINING SYSTEMS

(75) Inventors: Yanfei Jiang, Portland, OR (US); Mehmet E. Alpay, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1177 days.

(21) Appl. No.: 12/242,248

(22) Filed: Sep. 30, 2008

(65) Prior Publication Data
US 2009/0308853 A1 Dec. 17, 2009

Related U.S. Application Data

(60) Provisional application No. 61/073,300, filed on Jun. 17, 2008.

(51) Int. Cl.
*B23K 26/06* (2006.01)
*B23K 26/08* (2006.01)

(52) U.S. Cl. ............ 219/121.8; 219/121.73; 219/121.76

(58) Field of Classification Search ............. 219/121.73, 219/121.74, 121.75, 121.76, 121.77, 121.78, 219/121.79, 121.8, 121.81; 359/201.2, 202.1, 359/204.1, 205.1, 206.1
See application file for complete search history.

(56) References Cited

U.S. PATENT DOCUMENTS

| | | | |
|---|---|---|---|
| 4,427,873 A | | 1/1984 | Orita et al. |
| 4,461,947 A | * | 7/1984 | Ward ........................ 219/121.84 |
| 5,220,149 A | * | 6/1993 | Neidhardt ................. 219/121.67 |
| 6,057,525 A | * | 5/2000 | Chang et al. ............. 219/121.73 |
| 6,198,070 B1 | | 3/2001 | Nakayama |
| 6,462,306 B1 | * | 10/2002 | Kitai et al. ............... 219/121.77 |
| 6,969,822 B2 | | 11/2005 | Pollard |
| 2005/0279739 A1 | * | 12/2005 | Bruland et al. ............. 219/121.8 |
| 2006/0205183 A1 | * | 9/2006 | Morikazu ...................... 438/463 |
| 2007/0099439 A1 | * | 5/2007 | Van Borkulo et al. ........ 438/795 |

FOREIGN PATENT DOCUMENTS

| | | | | |
|---|---|---|---|---|
| GB | 2331038 | A | * | 5/1999 |
| JP | 56-122690 | A | | 9/1981 |
| JP | 58-205690 | A | | 11/1983 |
| JP | 02-011288 | A | | 1/1990 |
| JP | 3-189088 | A | * | 8/1991 |
| JP | 9-239578 | A | * | 9/1997 |
| JP | 10-193156 | A | * | 7/1998 |
| JP | 11-149317 | A | * | 6/1999 |
| JP | 2003-126982 | A | * | 5/2003 |
| JP | 2004-330271 | A | * | 11/2004 |
| JP | 2007-129225 | A | | 5/2007 |

OTHER PUBLICATIONS

Machine translation of Japan Patent No. 2003-126,982, Jul. 2012.*
Machine translation of Japan Patent No. 9-239,578, Jul. 2012.*
Machine translation of Japan Patent document No. 2004-330,271, Oct. 2012.*
Notification of Transmittal of the International Search Report and the Written Opinion of the International Searching Authority, or the Declaration dated Jan. 27, 2010, for PCT/US2009/047364, filed Jun. 15, 2009.

* cited by examiner

*Primary Examiner* — Geoffrey S Evans
(74) *Attorney, Agent, or Firm* — Stoel Rives LLP

(57) ABSTRACT

The embodiments disclosed herein provide systems and methods for correcting a head-to-head offset in a laser machining system with two or more processing heads. A focusing lens is associated with each processing head, and is configured to receive an incident laser beam along an incident beam axis of propagation. The incident beam axis of propagation is offset from the primary axis of the focusing lens. The focusing lens is further configured to rotate about the incident beam axis of propagation in order to steer the incident laser beam's path with respect to a workpiece.

18 Claims, 10 Drawing Sheets

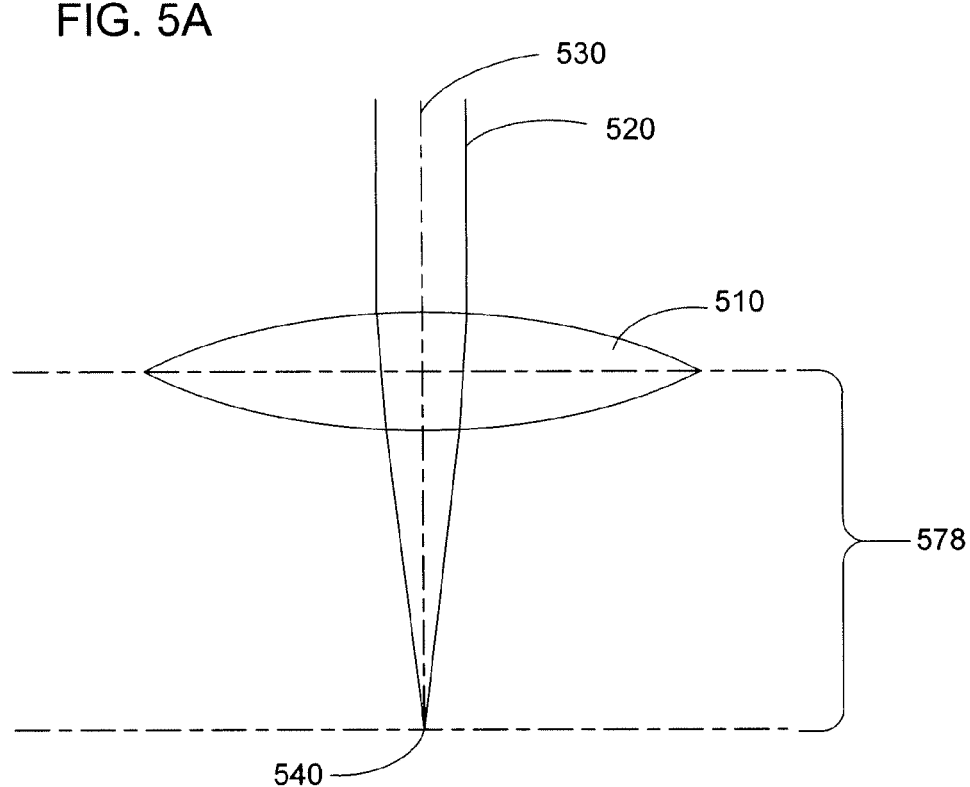
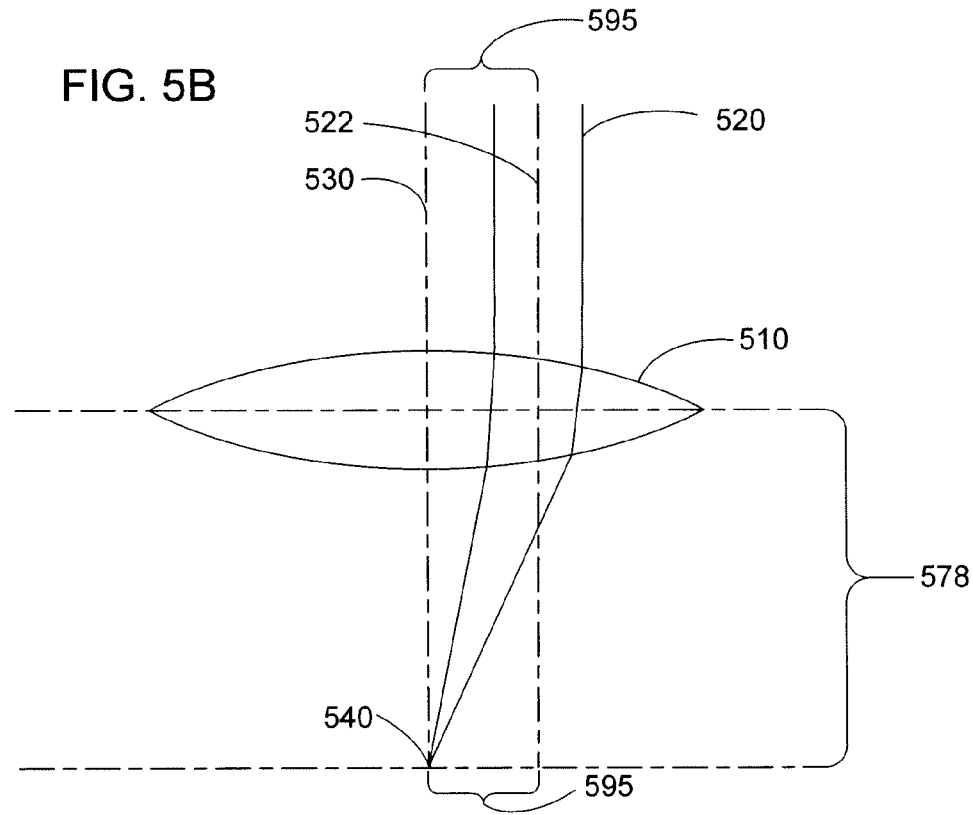

ELIMINATING HEAD-TO-HEAD OFFSETS ALONG COMMON CHUCK TRAVEL DIRECTION IN MULTI-HEAD LASER MACHINING SYSTEMS

RELATED APPLICATION

This application claims the benefit under 35 U.S.C. §119 (e) of U.S. Provisional Application No. 61/073,300, filed Jun. 17, 2008, which is hereby incorporated by reference herein in its entirety.

TECHNICAL FIELD

This disclosure relates to multi-head laser machining systems with a common part carrier, and in particular, to systems and methods for correcting a head-to-head offset in such systems.

BACKGROUND INFORMATION

A laser machining system, in which a plurality of processing heads share a common part carrier ("chuck"), may exhibit a head-to-head offset along the direction of chuck travel. A head-to-head offset is a misalignment between the processing heads in the direction of chuck travel. Failing to correct a head-to-head offset may result in degradation of the laser machining system's accuracy and performance.

FIG. 1 illustrates a two-head laser processing system 100 with a head-to-head offset 160. The system 100 includes a chuck 142 that moves a workpiece 143 in the direction of the Y-axis (as indicated by arrow 138). The chuck is shared by a processing head 126 and a processing head 130, which may concurrently process the workpiece 143. The processing heads 126, 130 are connected to an X-axis beam 132. The processing heads 126, 130 may move independently along the X-axis beam 132, in the direction of the X-axis (as indicated by arrows 134, 136). The processing heads 126, 130 emit laser beams 120, 128. Each processing head 126, 130 is optically associated with a focusing lens 112, 110 that focuses a respective incident laser beams 128, 120 on the workpiece 143. As illustrated, the head-to-head offset 160 is a misalignment of the laser beams 128, 120 in the direction of chuck travel. Because the chuck 142 is shared between the processing heads 126, 130, the head-to-head offset 160 may not be corrected by repositioning the chuck 142.

There are at least three common ways of addressing a head-to-head offset in a laser processing system: 1) the offsets are measured, and the chuck is commanded to move to an "average" position that minimizes the maximum deviation from the desired location for any one head; 2) the offsets are measured, and then eliminated as much as possible by adjusting the position of one or both processing heads in the direction of chuck travel (e.g., by using shims or set-screws); or 3) in the case of laser processing systems that include a secondary beam positioner (such as a tip-tilt mirror or a pair of galvanometers) for each processing head, the offsets are measured and compensated for by the secondary beam positioner. There are substantial problems with the three standard approaches outlined above for correcting a head-to-head offset. The details of the three standard approaches are illustrated in FIGS. 2, 3, and 4.

FIG. 2 illustrates a prior art approach for minimizing the error introduced by a head-to-head offset. This approach "splits the differences" of a head-to-head offset 260 between the processing heads 226, 230 by commanding a chuck 242 to move to an average or "compromise" position. Using this approach, the chuck 242 is positioned such that two target feature locations 270, 274 are along a line 262 that is at the midpoint of the head-to-head offset 260. As will be appreciated, the two processing heads 226, 230 cannot create the features at the target feature locations 270, 274 because of the head-to-head offset 260. Accordingly, the distance between the actual feature locations 272, 276 and the target feature locations 270, 274, respectively, is half of the total head-to-head offset 260. While this approach minimizes the worst-case feature placement error introduced by a head-to-head offset 260, this approach does not improve the spread of feature placement error, which remains equal to the total head-to-head offset 260.

FIG. 3 illustrates another prior art approach for correcting a head-to-head offset 360 between the processing heads 326, 330 by adjusting the position of a processing head 330 in the direction of chuck travel. In this approach, the processing head 330 is moved from a first position to a second position (shown as repositioned processing head 330' in phantom lines). The repositioning of the processing head 330 is in the direction of chuck travel (the Y-axis direction), and may thus compensate for the head-to-head offset 360. In other words, the repositioned processing head 330' may be aligned with the processing head 326. The processing head 330 may be repositioned by using shims or set screws. While this approach corrects the head-to-head offset 360, designing a processing head that allows for repositioning along the direction of chuck travel may be difficult, and the procedure for correcting the head-to-head offset 360 by repositioning the processing head 330 may also be difficult and time-consuming. A processing head that can be repositioned with respect to the X-axis beam 332, may not be as secure as a processing head that is permanently attached to the X-axis beam 332. This degraded stage stiffness may introduce vibration into the system when the processing head is moved. Finally, set screws or shims may move over time, which may cause the head-to-head offset to return.

FIG. 4 illustrates another prior art approach, where one or more secondary beam positioners 480, 485 are used to compensate for a head-to-head offset 460. Two processing heads (not shown) may be optically associated with the secondary beam positioners 480, 485. Each processing head may emit an incident laser beam 420, 428. The secondary beam positioners 480, 485 may each include a pair of galvanometers 481, 482 and 486, 487 connected to beam steering mirrors 483, 484 and 488, 489, respectively. The secondary beam positioners 480, 485 allows the incident laser beams 420, 428 to be quickly steered within respective limited scan fields 490, 492. The secondary beam positioners 480, 485 enable "fast" laser beam steering because the laser beams 420, 428 may be repositioned without moving the processing head (not shown) or the chuck 442. As illustrated, the secondary beam positioner 485 may be positioned so as to eliminate the head-to-head offset 460. This approach, however, requires sacrificing a portion of the limited scan field 492 associated with the secondary beam positioner 485. Only a portion 491 of the total limited scan field 492 may be used when the secondary beam positioner 485 is used to correct a head-to-head offset 460. While this approach may be tolerable in cases where the head-to-head offset is small in relation to the total limited scan field 492, this approach imposes additional limitations. For example, in laser machining systems that use assist gas flow that is substantially coaxial with the processing laser beam, the limited scan field may already be severely restricted because of a nozzle with a small orifice to direct the assist gas flow. In such systems, there may not be a substantial portion within the limited scan field to sacrifice for head-to-head offset compensation purposes.

SUMMARY OF THE DISCLOSURE

This disclosure relates to multi-head laser machining systems and, in particular, to systems and methods for correcting a head-to-head offset in systems in which multiple processing laser heads share a common part carrier. In one embodiment, a focusing lens is associated with each processing head, and is configured to receive an incident laser beam along an incident beam axis of propagation. The incident beam axis of propagation is offset from the primary axis of the focusing lens. The focusing lens is further configured to rotate about the incident beam axis of propagation in order to steer the incident laser beam's path with respect to a workpiece.

In another embodiment, a method is employed to steer an incident laser beam's path with respect to a workpiece. According to the method, a plurality of laser beams are emitted and are focused at respective target locations on the workpiece using a focusing lens. The laser beams are received along an incident beam axis of propagation, which is offset from a primary axis of the focusing lens. The focusing lens may be rotated about the incident beam axis of propagation to steer the incident laser beam's path with respect to the workpiece. The laser beam's path may be steered to a point where a head-to-head offset is eliminated.

In certain embodiments, the offset between the incident beam axis of propagation and the primary axis of the focusing lens is adjustable. In one embodiment, the offset may be introduced by a mechanical offset adapter.

In another embodiment, a secondary beam positioner may steer the incident laser beam within a limited scan field. The secondary beam positioner may include a pair of galvanometers. Each galvanometer may be connected to a steering mirror. In another embodiment, the secondary beam positioner may include a tip-tilt mirror.

In another embodiment, an assist gas flow may be used in conjunction with the incident laser beam. A nozzle may include an orifice through which an assist gas flows along a flow axis, and through which the incident laser beam propagates. The flow axis may be substantially coaxial with the incident beam axis of propagation.

Additional aspects and advantages will be apparent from the following detailed description of preferred embodiments, which proceeds with reference to the accompanying drawings.

BRIEF DESCRIPTION OF THE DRAWINGS

FIG. 5A illustrates a side view of a focusing lens focusing an incident laser beam, where the axis of propagation of the incident laser beam coincides with the primary axis of the focusing lens.

FIG. 5B illustrates a side view of a focusing lens focusing an incident laser beam, where the axis of propagation of the incident laser beam is offset from the primary axis of the focusing lens according to one embodiment.

DETAILED DESCRIPTION OF PREFERRED EMBODIMENTS

In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

Figure 1:
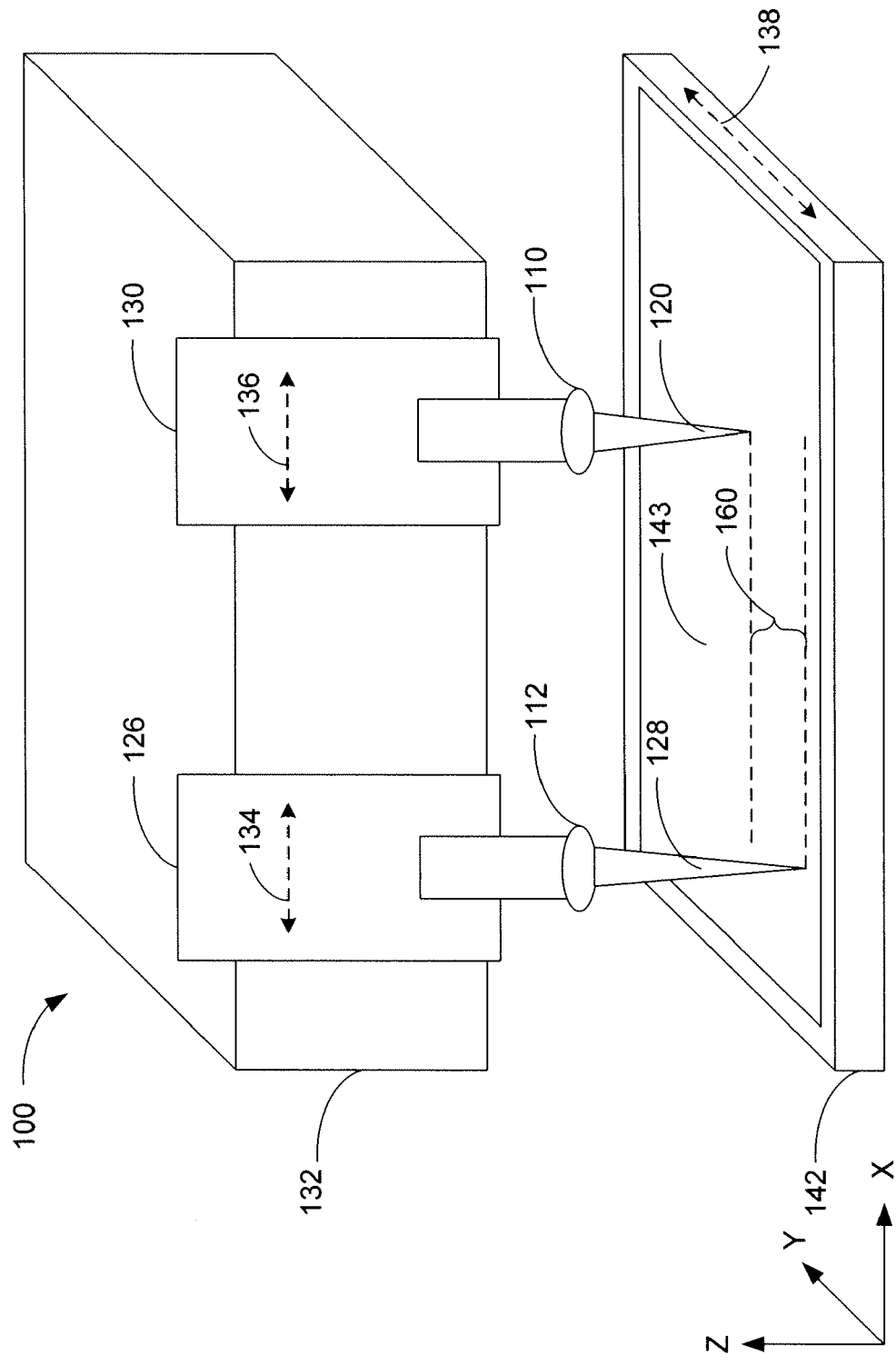
FIG. 1 shows a block diagram of a two-head laser processing system known in the art, and shows the presence of a head-to-head offset between the two processing heads along a chuck axis of travel.
Figure 2:
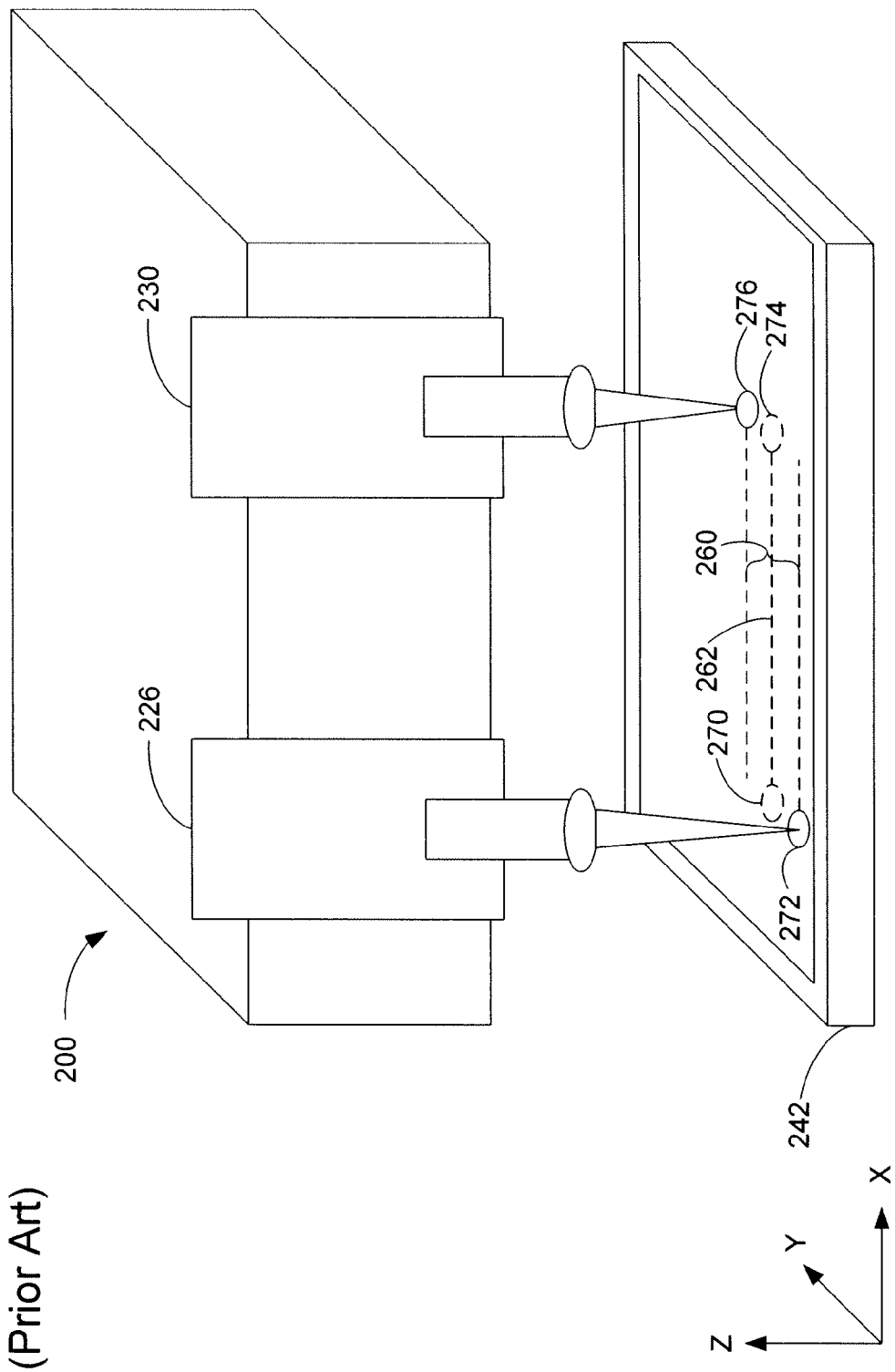
FIG. 2 shows a block diagram of a prior art approach for minimizing a head-to-head offset by positioning a workpiece such that a target location of a feature is located at the midpoint of the head-to-head offset.
Figure 3:
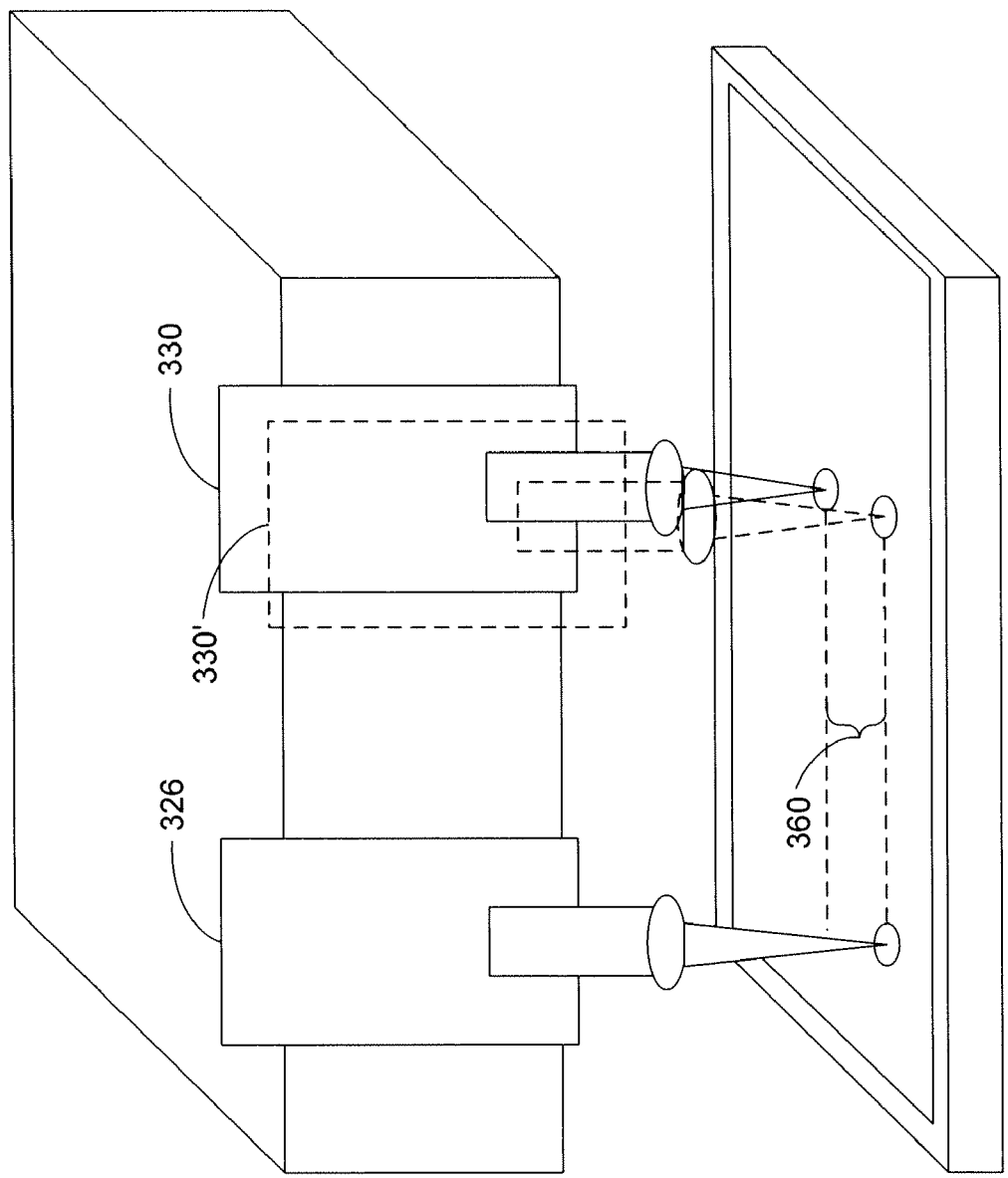
FIG. 3 shows a block diagram of a prior art approach for correcting a head-to-head offset by physically repositioning one of the processing heads along a chuck axis of travel.
Figure 4:
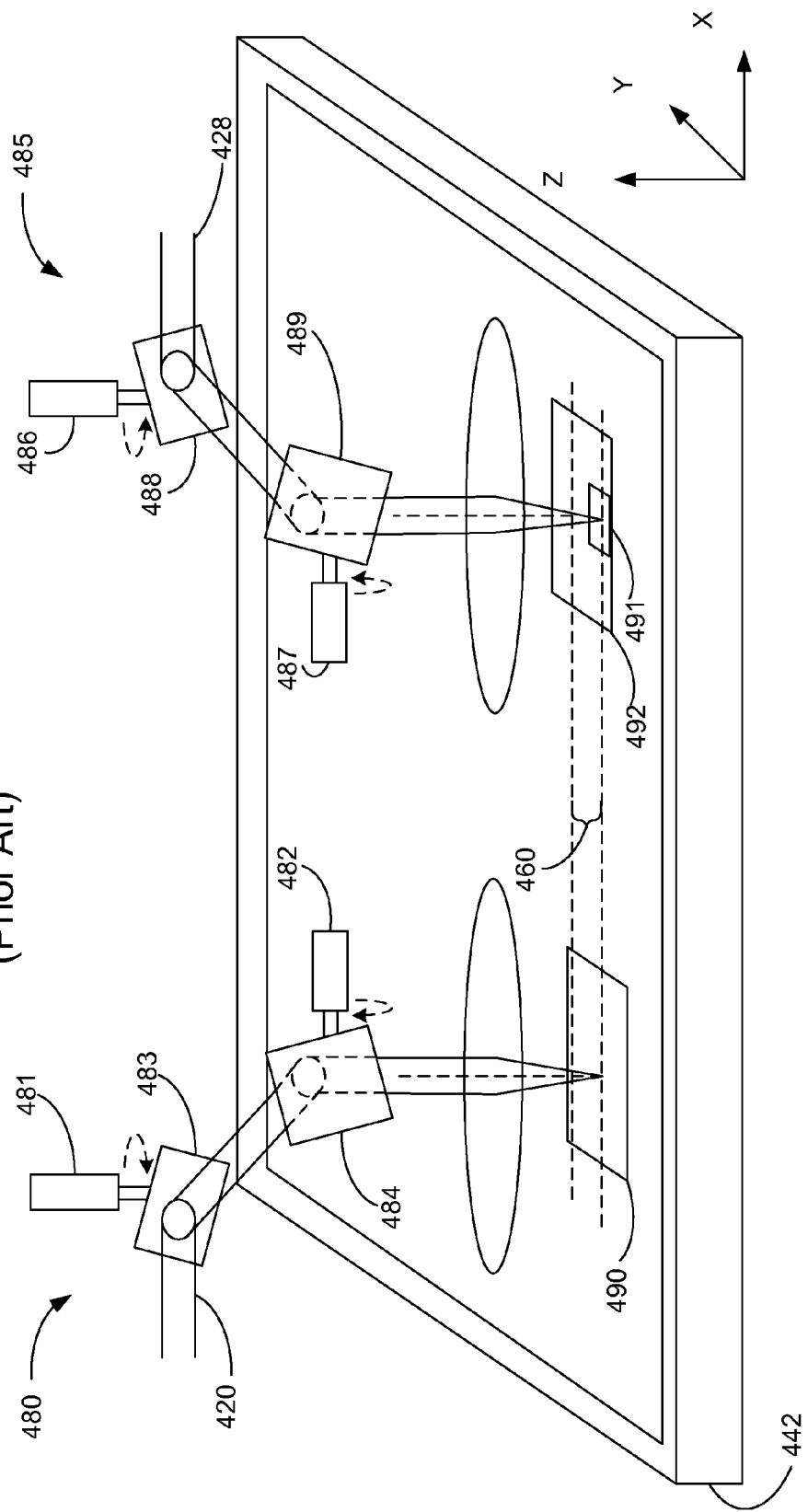
FIG. 4 shows a block diagram of a prior art approach for correcting a head-to-head offset utilizing a secondary beam positioner.
Figure 5C:
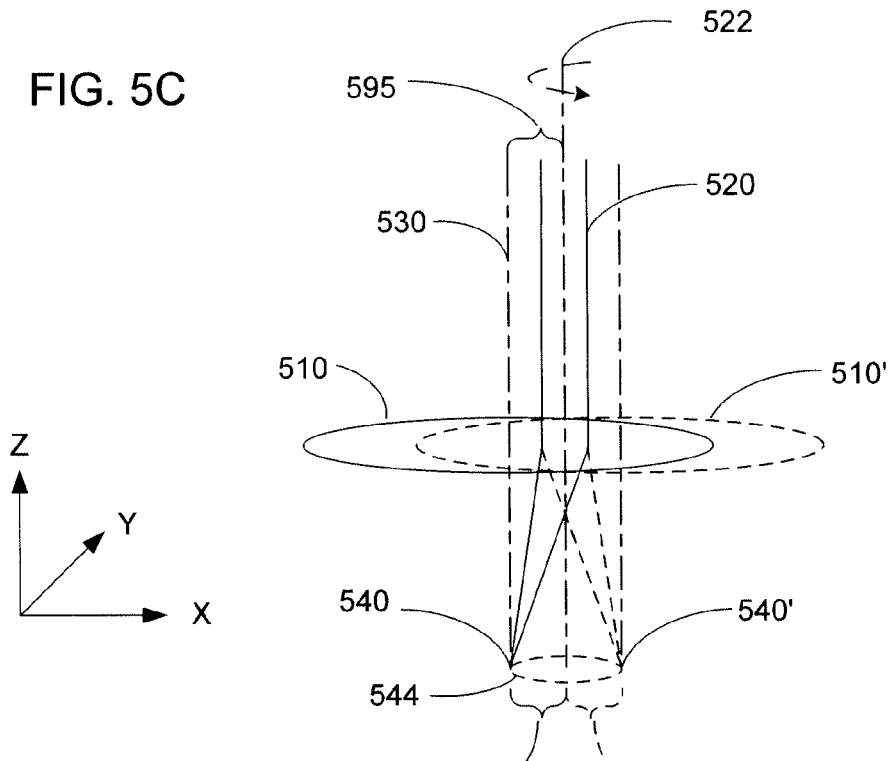
FIGS. 5C and 5D illustrate perspective views of a focusing lens focusing an incident laser beam, where the axis of propagation of the incident laser beam is offset from the primary axis of the focusing lens, and where the focusing lens is rotated about the axis of propagation of the incident laser beam according to certain embodiments.

As illustrated in FIGS. 5A, 5B, 5C, and 5D, a focusing lens 510 may be used to focus and deflect an incident laser beam 520. The focusing lens 510 may be embodied as a single-element lens, or it may be embodied as a multi-element lens. In various embodiments, the focusing lens 510 may be formed of glass, fused silica, or any other suitable material known to one having skill in the art. In FIG. 5A, the focusing lens 510 is symmetrical about a primary axis of the focusing lens 530 and is a converging lens. The focusing lens's focal distance 578 is the distance at which the incident beam 520 converges to a focal point 540. When the incident beam axis of propagation of the incident laser beam 520 is coaxial with the primary axis of the focusing lens 530, the focal point 540 is collinear with the primary axis of the focusing lens 530.

In FIG. 5B, the incident beam axis of propagation 522 of an incident laser beam 520 is offset a distance 595 from the primary axis of the focusing lens 530. If the focusing lens 510 is at its focal length 578, the focal point 540 is collinear with the primary axis of the focusing lens 530, and the distance between the focal point 540 and the incident beam axis of propagation 522 is equal to the distance of the offset 595.

FIG. 5C shows a perspective view illustrating the result of rotating the focusing lens 510 by 180 degrees about the incident beam axis of propagation 522. The rotated position is shown in phantom lines. When the incident beam 520 passes through the rotated focusing lens 510', the resulting focal point 540' is opposite from the focal point 540 with respect to the incident beam axis of propagation 522. Accordingly, if the focusing lens 510 is at its focal length, the focal point 540 remains collinear with the primary axis of the focusing lens 530, and the distance between the focal point 540 and the incident beam axis of propagation 522 is equal to the distance of the offset 595.

The focusing lens 510 may be arbitrarily rotated about the incident beam axis of propagation 522. As the focusing lens 510 is rotated about the incident beam axis of propagation 522, the focal point 540 follows a circular trajectory 544, with the center of the circular trajectory 544 being collinear with the incident beam axis of propagation 522 and with a radius equal to the offset 595 between the incident beam axis of propagation 522 and the primary axis of the focusing lens 530. The circular trajectory 544 is in the plane defined by the X-axis and the Y-axis.

Figure 5D:
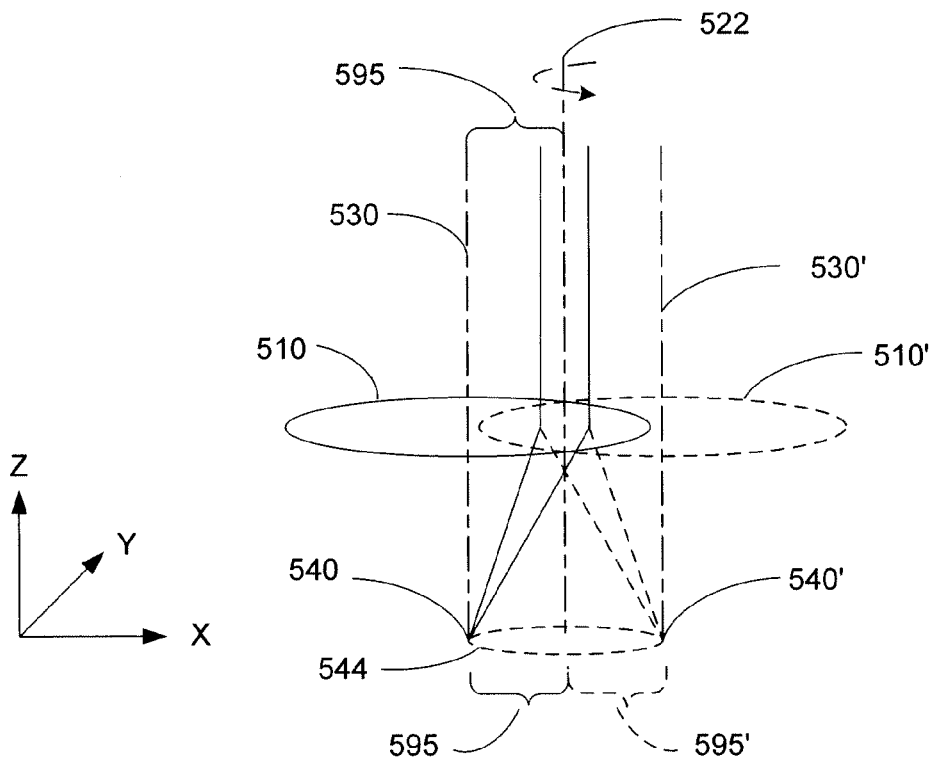

FIG. 5D illustrates that the radius of the circular trajectory 544 may be increased by increasing the distance 595 between the primary axis of the focusing lens 530 and the incident beam axis of propagation 522. The radius of the circular trajectory 544 resulting from rotating the focusing lens 510 about the incident beam axis of propagation 522 is correspondingly increased. By rotating the focusing lens 510, the focal point 540 is moved in the direction of the Y-axis.

Figure 6:
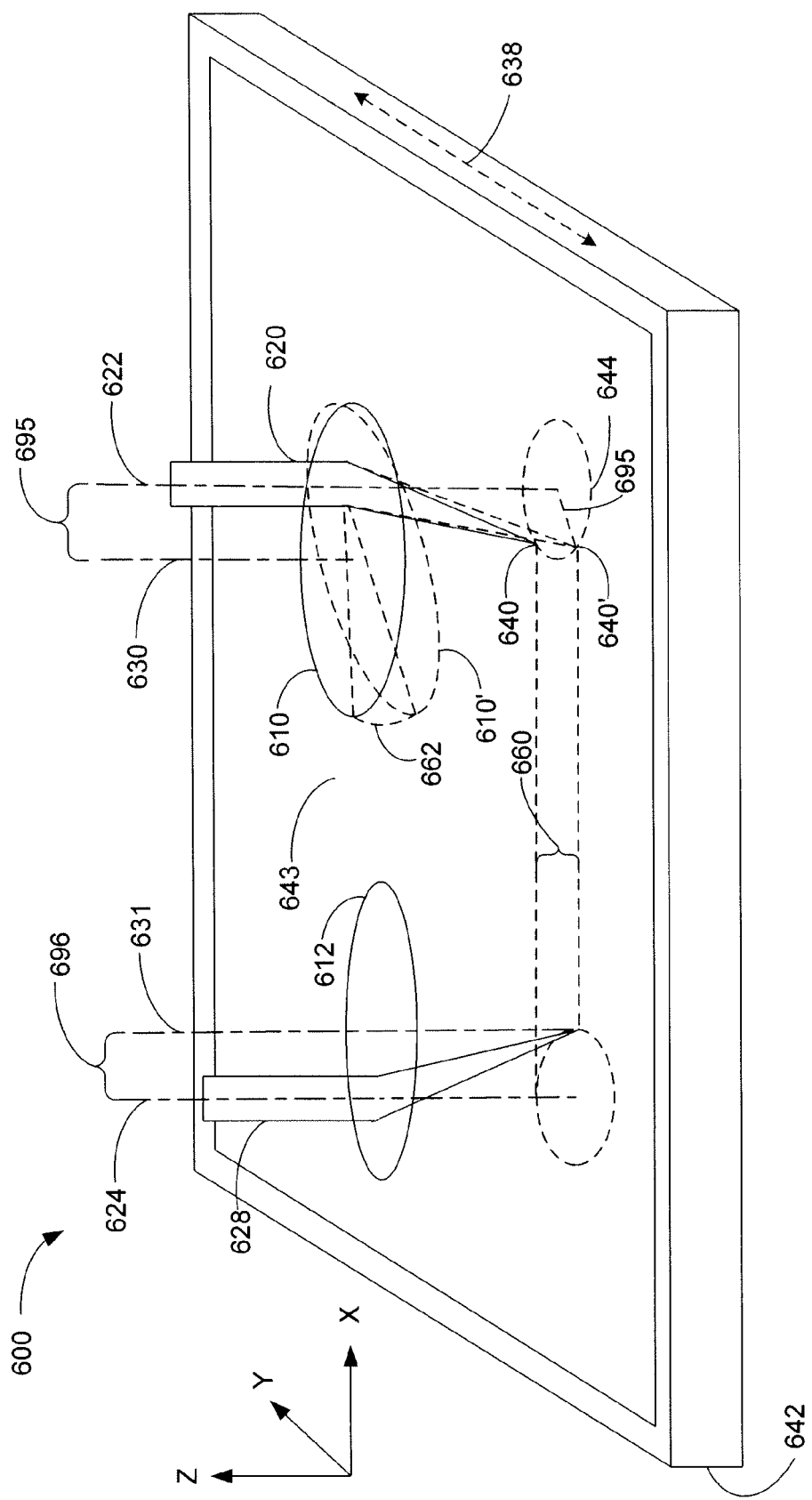
FIG. 6 illustrates a block diagram of a system for correcting a head-to-head offset in a laser-processing system using a focusing lens having a primary axis that is offset from the incident beam axis of propagation, and which is rotateable about the incident beam axis of propagation according to one embodiment.

FIG. 6 illustrates a laser processing system 600 with a head-to-head offset 660. The system 600 comprises a chuck 642 carrying a workpiece 643. The chuck 642 moves the workpiece 643 in the direction of the Y-axis (as indicated by arrow 638). Focusing lenses 610, 612 are disposed in the optical path of laser beams 620, 628. Offsets 695, 696 are present between the axes of beam propagation 622, 624 of the incident laser beams 620, 628 and the primary axes of the focusing lenses 630, 631. The focusing lenses 610, 612 are rotateable about their respective axes of beam propagation 622, 624.

Rotating the focusing lens 610 about its incident beam axis of propagation 622 allows the focal point 640 to be steered in a circular trajectory 644 on a workpiece 643. The circular trajectory 644 is in the plane of the surface of the chuck 642 and the workpiece 643 (i.e., the plane defined by the X-axis and the Y-axis). Because the direction of chuck travel is in the plane of the chuck 642, the focal point 640 may be manipulated in the direction of chuck travel (i.e., the Y-axis) by rotating the focusing lens 610 to a desired location. The circular trajectory 644 has a component of motion in a direction perpendicular to the chuck axis of travel (i.e., the X-axis); however, the processing heads (not shown) may be movable along the X-axis, and thus may be able to compensate for movement in the X-axis caused by rotating the focusing lens 610 about the incident beam axis of propagation 622.

As is illustrated in FIG. 6, the focusing lens 610 is rotated from a first position to a second position (shown as rotated focusing lens 610' in phantom lines). The rotated focusing lens 610' has been rotated by an angle 662. Rotating the focusing lens 610 between the first position and the second position moves the focal point 640 of the incident laser beam 620 along the circular trajectory 644 to a focal point 640' such that the head-to-head offset 660 is substantially eliminated. The radius of the circular trajectory 644 (assuming the lens 610 is at its focal length) is equal to the offset 695 between the incident beam axis of propagation 622 and the primary axis of the focusing lens 630.

As illustrated, the laser beam 620 may have a non-vertical angle of attack with respect to the workpiece 643. The non-vertical angle of attack may advantageously prevent back-reflections of the incident laser beam 620.

It will be appreciated by those having skill in the art that for a multi-head laser machining system having N number of processing heads, only N−1 of those processing heads need be equipped for offset and rotation of their associated focusing lenses. Such an arrangement might be problematic in practice, however, because it forces all N−1 "adjustable" processing heads to match the nonadjustable processing head, which may not be possible, depending on the amount of offset one is trying to compensate for. If, by chance, the one nonadjustable processing head happens to have an offset itself, there would be a halving of the overall adjustment range (in a worst case scenario) by keeping that processing head fixed and trying to adjust all other processing heads to match it.

Figure 7:
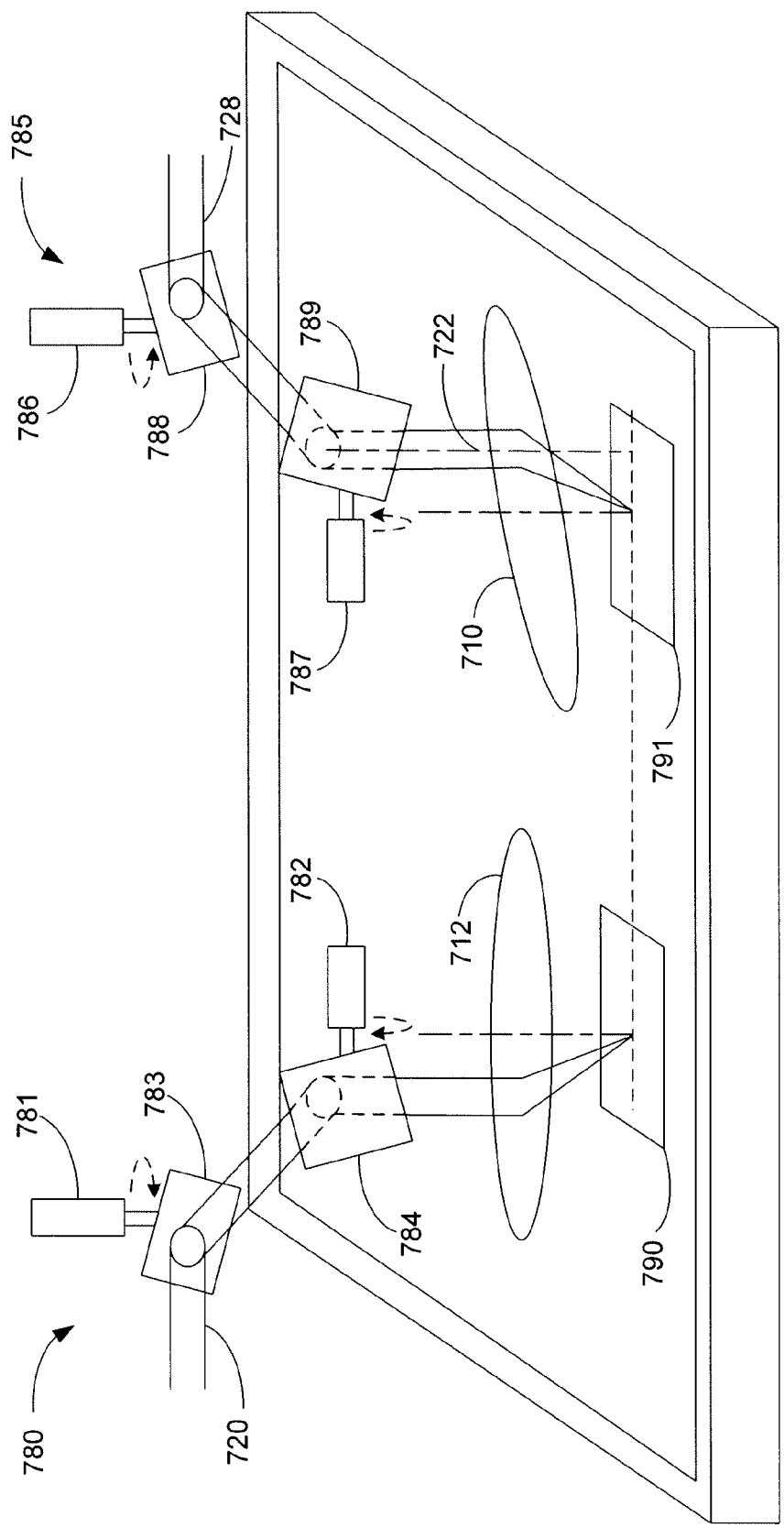
FIG. 7 shows a block diagram of a laser processing system that includes a secondary beam positioner optically associated with each processing head according to one embodiment.

FIG. 7 shows an embodiment of a laser processing system that includes secondary beam positioners 780, 785 optically associated with two processing heads (not shown). Each secondary beam positioner 780, 785 comprises a pair of galvanometers 781, 782 and 786, 787. The galvanometers 781, 782 and 786, 787 are connected to respective mirrors 783, 784 and 788, 789 that steer respective laser beams 720, 728. The laser beams 720, 728 are focused and deflected by focusing lenses 710, 712. The focusing lens 710 has been rotated about an incident beam axis of propagation 722 so as to compensate for a head-to-head offset (not shown). Accordingly, the secondary beam positioners 780, 785 are able to steer the laser beams 720, 728 within the full areas of their respective limited scan fields 790, 791. In alternative embodiments, a secondary beam positioner may comprise a tip-tilt mirror.

Figure 8A:
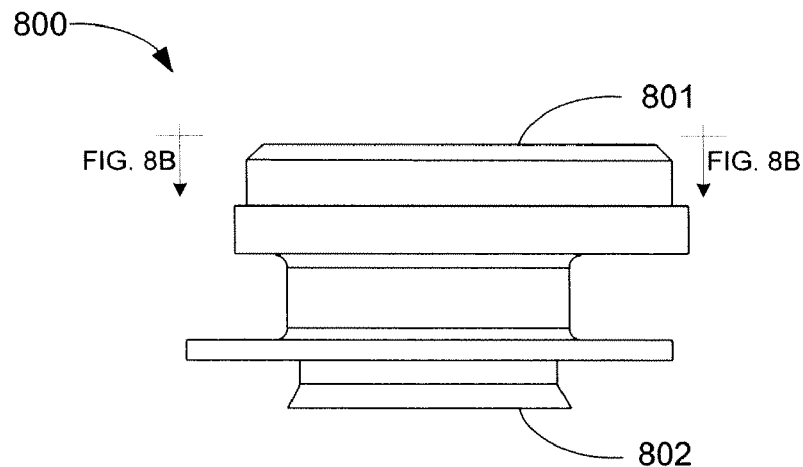
FIG. 8A is a side view of an offset adapter according to one embodiment.
Figure 8B:
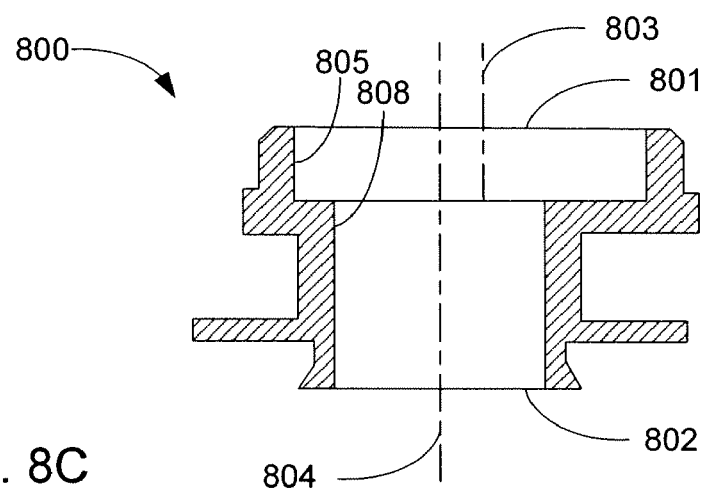
FIG. 8B is a cross section view of an offset adapter according to one embodiment.
Figure 8C:
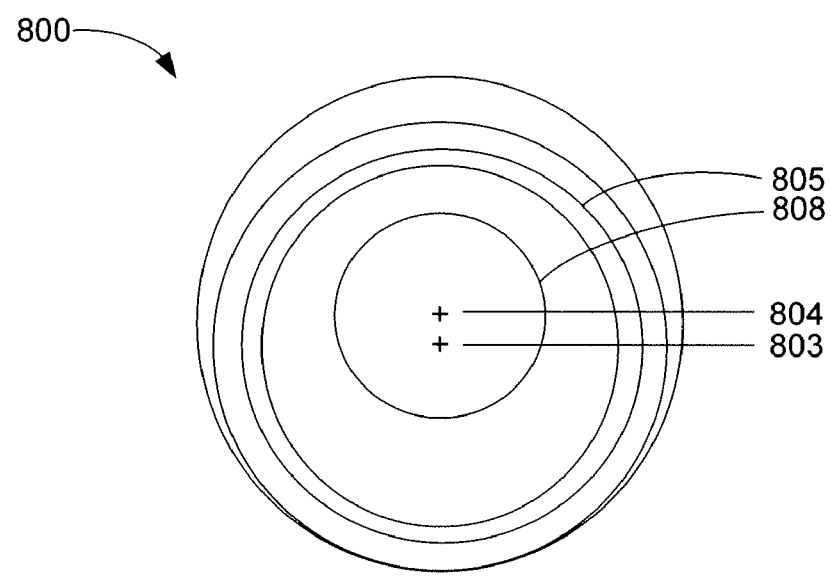
FIG. 8C is a top view looking through an offset adapter according to one embodiment.

An offset between an axis of propagation of an incident laser beam and the primary axis of a focusing lens may be created by an offset adaptor 800. FIGS. 8A, 8B, and 8C illustrate one embodiment of an offset adaptor 800. In FIG. 8A, a first end 801 of the offset adapter 800 may be connected to a processing head (not shown) configured to emit a laser beam. A second end 802 may be connected to a cutting head containing a focusing lens (not shown). As illustrated in the cross-section view shown in FIG. 8B, a first section 805 of the offset adaptor 800 may be symmetrical about a first axis 803, while a second section 808 may be symmetrical about a second axis 804. FIG. 8C shows a top view looking through the offset adaptor 800 and further illustrates the offset between the axes of symmetry 803, 804 (each designated by a "+" symbol) of the first end 801 and the second end 802, respectively. The offset adaptor 800 may be manufactured from aluminum, stainless steel, or the like. In other embodiments, the offset between the axes of symmetry 803, 804 may be adjustable.

The offset adaptor 800 may be incorporated into a laser processing system where the first axis 803 corresponds to an axis of propagation of an incident laser beam and the second axis 804 corresponds to a primary axis of a focusing lens. In this way, an offset may be created between the axis of propagation of an incident laser beam and the primary axis of a focusing lens. The offset adaptor 800 may be connected to a processing head configured to generate an incident laser beam aligned with the first axis 803. The offset adaptor 800 may be connected to a processing head in such a way that the offset adapter is rotateable about the first axis 803.

Figure 9:
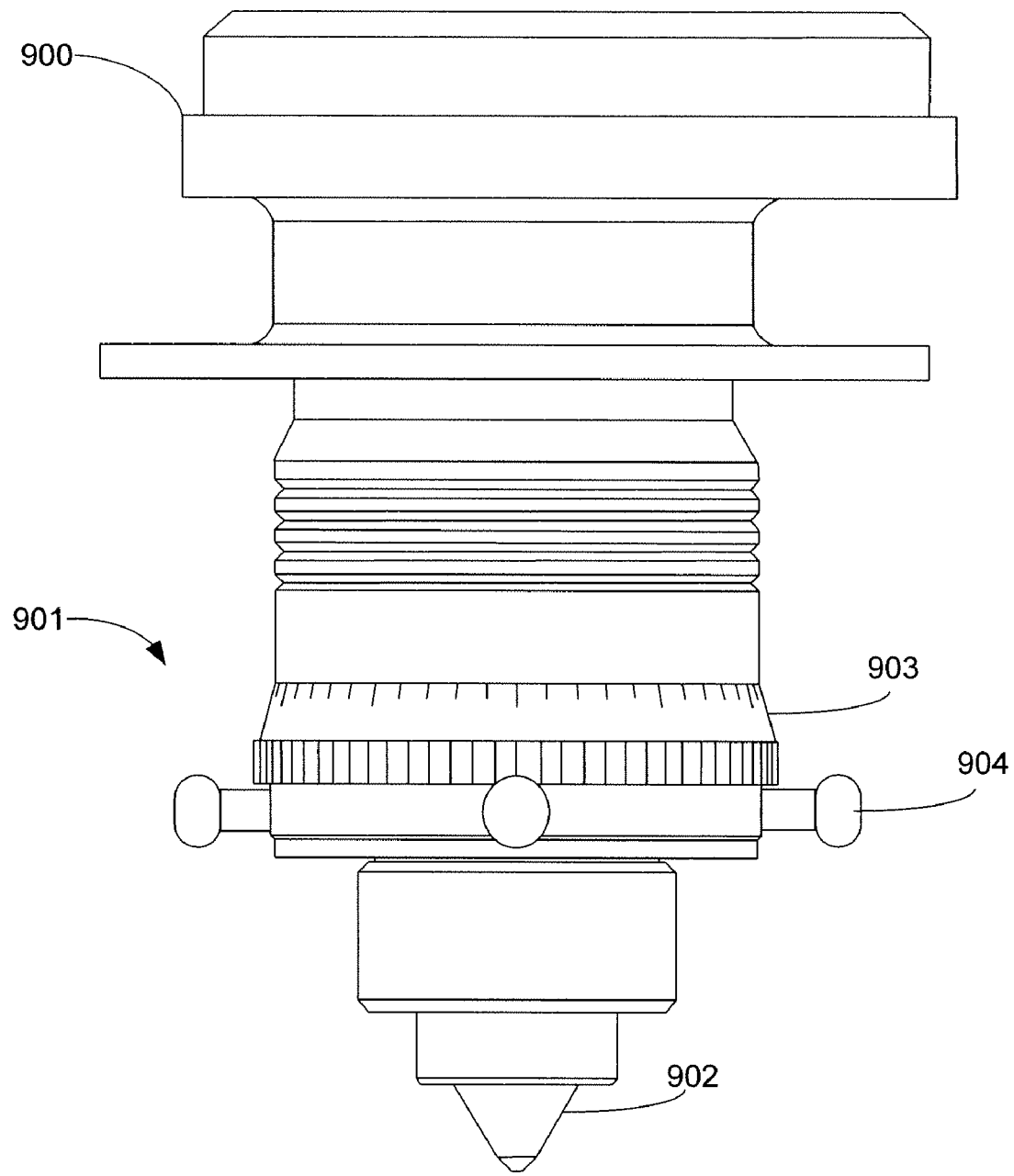
FIG. 9 illustrates a schematic view of an offset adapter connected to a cutting head according to one embodiment.

FIG. 9 illustrates an embodiment of an offset adaptor 900 connected to a cutting head 901. The cutting head 901 is configured to direct an assist gas along a flow axis. The cutting head 901 comprises a nozzle 902, through which the assist gas flows, and through which an incident laser beam passes. One or more nozzle centering adjustment screws 904 may adjust the nozzle 902 position in the X-Y plane. The incident laser beam may be substantially coaxial with the flow axis. The cutting head 901 may further comprise an adjustable focus ring 903 for focusing the incident laser beam. The cutting head 901 further comprises a focusing lens (not shown).

In one embodiment, the offset adaptor 900 may be secured to the cutting head 901 by set screws. The other side of the offset adaptor 900 may be secured to a processing head (not shown) or galvanometer block (not shown) by servo clamps. The focusing lens, which is comprised within the cutting head 901, may be rotated about the incident beam axis of propagation by loosening the servo clamps that hold the adapter against the bottom of the processing head or galvanometer block, manually rotating the offset adapter 900. Once the desired position has been achieved, the servo clamps may be tightened to secure the adapter in a new rotated position. In another embodiment, an electromechanical mechanism, such as a worm drive driven by a motor, may be used to rotate the offset adaptor 900 with respect to the processing head or galvanometer block.

It will be understood by those having skill in the art that many changes may be made to the details of the above-described embodiments without departing from the underlying principles of the invention. The scope of the present invention should, therefore, be determined only by the following claims.

The invention claimed is:

1. A laser processing system for processing a workpiece, comprising:
   a plurality of processing heads configured to emit respective laser beams toward target locations on the workpiece; and
   a focusing lens associated with each processing head to focus the laser beams at their respective target locations on the workpiece,
   wherein at least one of the focusing lenses is configured:
      to receive an incident laser beam along an incident beam axis of propagation, wherein the incident beam axis of propagation is offset from a primary axis of the focusing lens; and
      to rotate about the incident beam axis of propagation to steer the incident laser beam's path with respect to the workpiece to a point where a head-to-head offset is substantially eliminated.

2. The system of claim 1, wherein at least one focusing lens is further configured to adjust the offset between the incident beam axis of propagation and the primary axis of the focusing lens.

3. The system of claim 1, further comprising:
   a chuck configured to carry the workpiece in a direction of chuck travel; and
   wherein the offset and the rotation of the focusing lens about the beam axis of propagation compensates for a head-to-head offset along the direction of chuck travel between the plurality of processing heads.

4. The system of claim 1, further comprising a secondary laser beam positioner optically associated with each processing head; the secondary laser beam positioner configured to steer the incident laser beam within a limited scan field.

5. The system of claim 4, wherein the secondary laser beam positioner comprises a plurality of galvanometers, and wherein each of the plurality of galvanometers is connected to a steering mirror.

6. The system of claim 4, wherein the secondary laser beam positioner comprises a tip-tilt mirror.

7. The system of claim 1, further comprising a nozzle including an orifice through which an assist gas flows along a flow axis, and through which the incident laser beam propagates; the flow axis being substantially coaxial with the incident beam axis of propagation.

8. The system of claim 1, further comprising an offset adaptor disposed between a processing head and a focusing lens, the offset adaptor comprising:
   a first section symmetrical about a first axis; and
   a second section symmetrical about a second axis,
   wherein the first axis is offset from the second axis.

9. A method for processing a workpiece using a laser processing system, the method comprising:
   emitting respective laser beams toward target locations on the workpiece from a plurality of processing heads;
   focusing each incident laser beam at its respective target location on the workpiece using a focusing lens associated with each processing head;
   receiving an incident laser beam along an incident beam axis of propagation, wherein the incident beam axis of propagation is offset from a primary axis of the focusing lens; and
   rotating the focusing lens about the incident beam axis of propagation to steer the incident laser beam's path with respect to the workpiece to a point where a head-to-head offset is substantially eliminated.

10. The method of claim 9, further comprising:
    adjusting the offset between the incident beam axis of propagation and the primary axis of the focusing lens.

11. The method of claim 9, further comprising:
    steering the incident laser beam within a limited scan field using a secondary beam positioner.

12. The method of claim 9, further comprising:
    connecting an offset adaptor to a processing head, the offset adaptor comprising:
       a first section symmetrical about a first axis; and
       a second section symmetrical about a second axis,
       wherein the first axis is offset from the second axis.

13. The method of claim 9, further comprising:
    directing an assist gas flow through a nozzle along a flow axis, the incident laser beam propagating in a substantially coaxial relationship with the flow axis.

14. A laser processing system for processing a workpiece, comprising:
    a plurality of means for emitting respective laser beams toward target locations on the workpiece; and
    means for focusing the laser beams at their respective target locations on the workpiece,
    wherein at least one of the means for focusing the laser beams further comprises:
       means for receiving an incident laser beam along an incident beam axis of propagation, wherein the incident beam axis of propagation is offset from a primary axis of the focusing lens; and
       means for rotating the focusing lens about the incident beam axis of propagation for steering the incident laser beam's path with respect to the workpiece to a point where a head-to-head offset is substantially eliminated.

15. The system of claim 14, further comprising means for directing an assist gas flow along a flow axis, the flow axis being substantially coaxial with the incident beam axis of propagation.

16. The system of claim 14, wherein the at least one means for focusing the laser beams is further configured to adjust the offset between the incident beam axis of propagation and the primary axis of the focusing lens.

17. The system of claim 14, further comprising:
means for carrying the workpiece in a first direction; and
wherein the offset and the rotation of the at least one means for focusing the laser beams about the beam axis of propagation compensates for a head-to-head offset along the first direction between the plurality of means for emitting respective laser beams.

18. The system of claim 14, further comprising means for steering the incident laser beam within a limited scan field; said means for steering the incident laser beam being optically associated with each processing head.

* * * * *